Aug. 17, 1937.   H. W. PORTER ET AL   2,090,228
PRUNER OR LIKE TOOL
Filed April 11, 1935   2 Sheets-Sheet 1
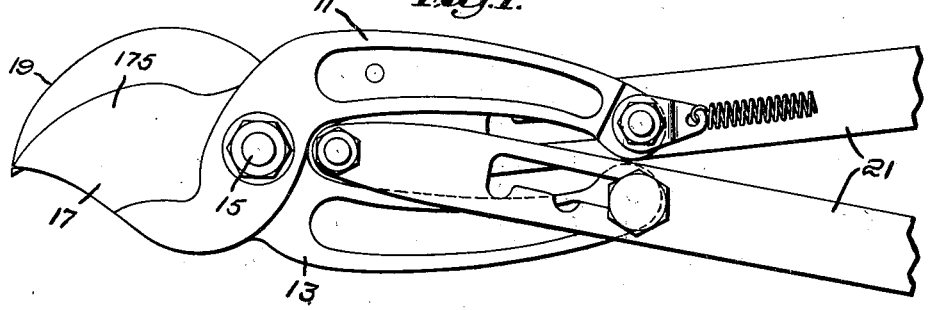
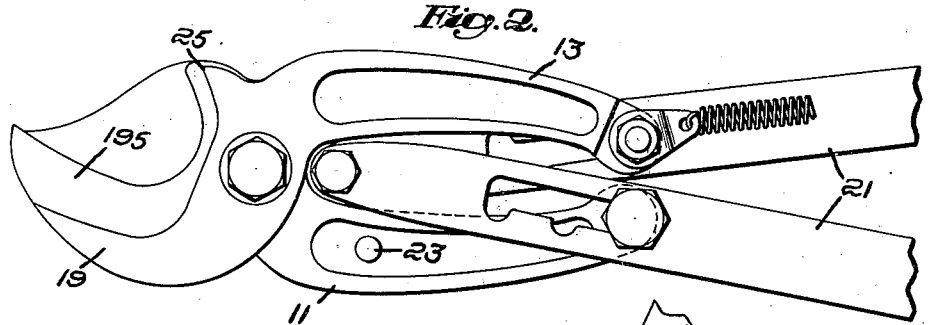
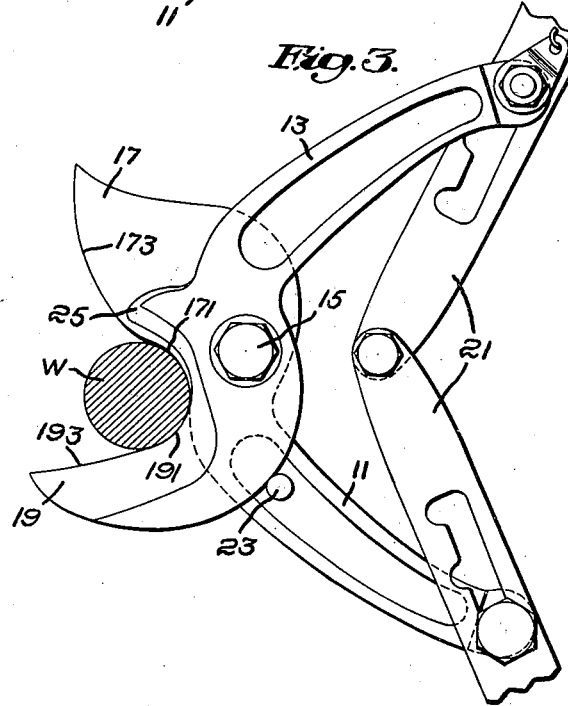
Inventors:
Henry W. Porter,
John W. Geddes,
by Emery, Booth, Varney & Townsend
Attys Aug. 17, 1937.  H. W. PORTER ET AL  2,090,228
PRUNER OR LIKE TOOL
Filed April 11, 1935  2 Sheets—Sheet 2
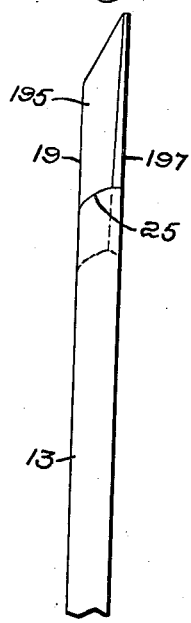
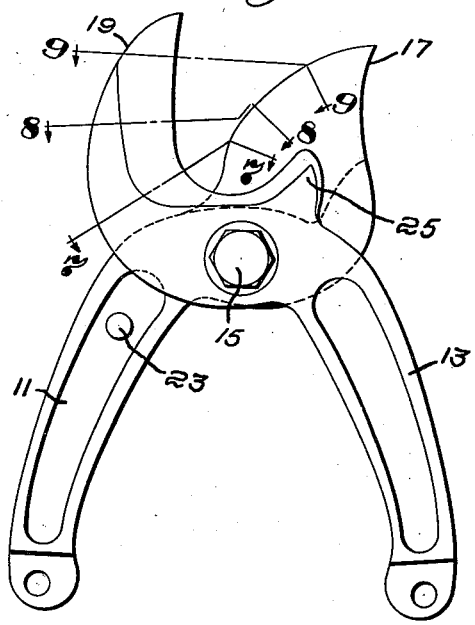
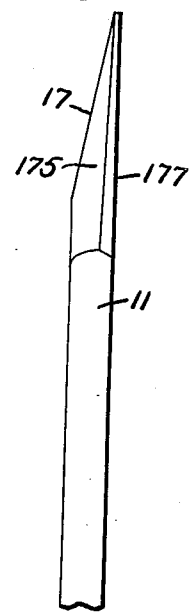
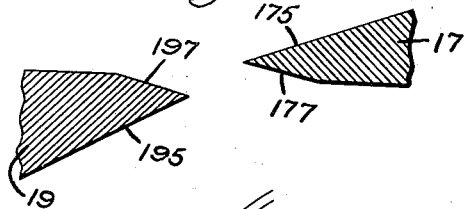
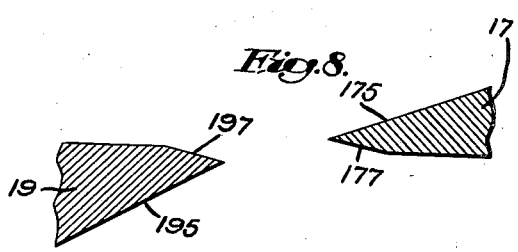
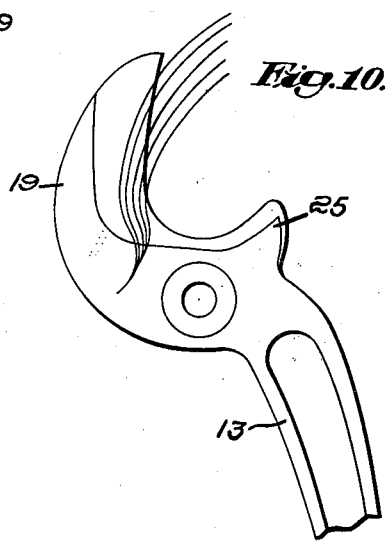
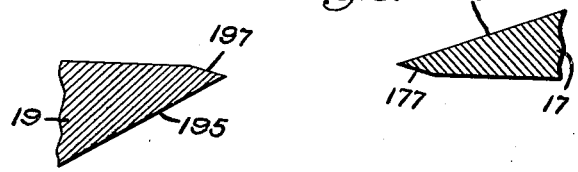
Inventors:
Henry W. Porter,
John W. Geddes,
by Emery, Booth, Varney & Townsend
Att'ys Patented Aug. 17, 1937

2,090,228

UNITED STATES PATENT OFFICE 2,090,228

PRUNER OR LIKE TOOL

Henry W. Porter, Brookline, and John W. Geddes, Watertown, Mass., assignors to H. K. Porter, Inc., Everett, Mass., a corporation of Massachusetts Application April 11, 1935, Serial No. 15,756

15 Claims. (Cl. 30—252)

This invention relates to cutters of the type wherein the cutting blades move past or over each other in the manner of shears, and the object is to provide a tool for cutting objects particularly of rod-like or strand-like nature as distinguished from tools for slitting sheets of relatively large area across their width, which will be easy to use and efficient in action. A particularly advantageous application of the invention is to a pruner and for convenience in the following description we shall refer specifically to a pruner and describe the functioning of the particular embodiment of our invention which is shown by way of example in the accompanying drawings as manifested in a pruning operation.

In the accompanying drawings of such specific embodiment to which the following description will more particularly address itself:—

Figs. 1 and 2 are obverse and reverse plan views of a pruner in closed position, a portion of the operating handles being broken away;

Fig. 3 is a view corresponding to Fig. 2 showing the cutter wide open;

Fig. 4 is a view of the blade-carrying levers proper similar to Fig. 3 showing the cutter partly closed;

Figs. 5 and 6 are edge views of the blade levers partly broken away and on an enlarged scale;

Figs. 7, 8, and 9 are fragmentary sections on an enlarged scale on the correspondingly numbered lines of Fig. 4. The relative distance between the sections of the blades, however, is not in proportion and they have been shown closer together than a section enlarged to this scale would properly call for; and Fig. 10 is a partial view of one of the blade levers with lines indicating successive positions of the other blade relative thereto.

Referring to the drawings, the pruner there shown comprises two levers 11 and 13 pivoted together, herein by being crossed at the single pivot pin 15, and formed at their outer ends with blades 17 and 19 respectively, the inner faces of which move over one another in the manner of scissors or shears. Herein one of the blades 19 has a cutting edge of generally concave form throughout and the other blade 17 has an outer portion of generally convex form. The contours are hereinafter more fully described. Both are truly blades, being edged and acting to cut, but the major portion of the cutting may be effected by the blade 17. Herein we have shown the levers 11 and 13 as operated as part of a compound lever system by operating handles 21 which are here illustrated as substantially like those described in the patent to McKenney 1,607,470, dated Nov. 16, 1926, and not necessary here to describe since the method of actuating the blade-carrying levers is not material to the invention.

Pruning shears should be easily adjusted to the work and should make an easy clean cut without unduly bruising or tearing the bark in such a manner that disease may attack the stump. Difficult problems arise in practice because a blade, if it is to stand up to its work, must have a heavy back on which the edge is formed by a major bevel. As this cuts into the solid branch, it wedges into the wood and there is a reaction transverse to the plane of the inner faces of the blades tending to displace them sidewise. In one type of pruner a single blade is sharpened and the other lever is a blunt hook-like member which merely engages the side of the branch. The reaction on the cutting blade scrapes this hook along the side of the branch and objectionably bruises or tears the bark. On the other hand, in cases where both blades bite into the work the reaction displaces them sidewise and twists them torsionally and they cross, that is, the edges meet each other edge to edge before the cut is completed. This latter effect has been minimized in practice by making the distal ends of the blades overlap mutually to support each other before the cut is completed, but this restricts the throat opening between the blades except when the levers are spread wide, rendering them less convenient to use, especially when operating on small twigs or suckers and in confined spaces.

The disadvantages generally discussed in the preceding paragraph are obviated by our construction which we will now describe in greater detail. Referring to Fig. 3, when the blades are opened to their widest extent as determined by a stop 23, here shown as engaging the rear edge of blade 19, the inner portions 171 and 191 of the cutting edges are presented as circular arcs forming a portion of a common circle, the combined arc being not greater than and conveniently, as herein shown, substantially a semi-circle. From one extremity of arc 191 the cutting edge of blade 19 may extend tangentially to the circle in a concave arc 193 which may be of greater radius than the arc 191. The edge of blade 17 extends tangentially from the extremity of the circular arc 171, substantially at a point determined by a tangent drawn from pivot 15 to the circular arc, in a smooth curve 173 of generally spiral form. The spiral nature of this curve may be understood from Fig. 10 wherein the several lines superposed upon the drawing of blade 19 represent successive positions of the edge of blade 17. For each angular increment of closing movement a cutting increment is provided, thus giving a spiral trend to the edge. The increment need not, however, be uniform throughout the entire arc, and we find it convenient to make the contour of the edge essentially several spiral arcs merging smoothly one into the other.

As best seen in Fig. 3, with the edges formed in this way a throat is defined between the two blades having a semi-circular bottom and diverging sides free of any restriction. A branch or other piece of work w up to the diameter of the semi-circle is easily inserted and bottomed in this throat. As the blade closes to the position of Fig. 4, the open character of the throat is preserved and the distal ends of the blades remain separated until the cutter is completely closed. As the cut is completed, due to the spiral arrangement of the edge 173 the angle between the blades remains substantially constant.

In the present instance, the cutters being loaded, when they commence to close the sharp edges of the blades immediately cut into the branch from both sides, cleanly severing the bark. These portions of the blades remain engaged in the work while the severing action is completed. Both of the blades are sufficiently sharp to initially enter the work in the manner thus described. Thereafter the major portion of the cutting may be completed by the blade 17 and, as seen by Figs. 7, 8, and 9, this blade may be relatively thin, the angle of the major bevel 175 on the outer face of the blade being substantially constant. In other words, the angle between the inner face of the blade at the lower part of the figures and the outer bevel 175 at the upper portion is constant. The blade 19, on the contrary, may be a supporting blade which after it has entered the work will tend to stall therein and lock itself in the fibers against transverse deflection, remaining relatively stationary while the cut is completed by the thin blade 17. We have therefore shown the major bevel of blade 19 as relatively blunt, but we prefer to gradually taper the angle toward the distal end of the blade. Thus, referring again to Figs. 7, 8, and 9, the angle between the inner face of the blade 19 at the upper portion of the figures and the surface of the major bevel at the lower portion of the figures becomes more acute as we pass from Fig. 7 to Fig. 8 to Fig. 9. The outer portion of the blade is thus more delicate and while a rugged support is offered at the inner portion near the pivot tending to maintain both blades in their proper position and a strong, firm edge for operating on heavier work, the outer portions of the blades, which would be used in snipping small branches or suckers, in which case the deforming tendency of the work is minimized, have a more delicate edge promoting a cleaner cut.

The cutting edges proper of the blades are defined by the minor bevels 177 and 197 formed on the inner faces thereof. These bevels may be of substantially constant angle relative to the inner face of the blade but decrease in width toward the outer or distal ends of the blade in such manner that the edge proper as defined by the intersection of the major bevels and the minor bevels converge inwardly toward the points of the blades, being more widely spaced from each other adjacent the pivot, as is clearly seen from Figs. 5 and 6, and also from Figs. 7, 8 and 9. There is thus provided adjacent the inner ends of the blades where heavier work is done a relatively rugged, coarse edge, yet, as above described, sufficiently acute in the case of blade 19 to sever the bark and anchor itself in the fibers of the wood and in the case of the blade 17 to complete the cut, while near the outer ends of the blades where lighter cuts are made the edges are more delicate. By providing a constant angle on the minor bevel in this manner this graduation of the edge is most readily provided for.

To prevent distortion of the edges, whether by deflection of the blades due to their wedging action in the work or torsion due to the fact that the resistance is at one side of the neutral axis, a distortion which in the case of a pruner as above described has a tendency to cross the blades, we provide means whereby the levers may mutually support one another radially outward of the normal overlapping or hub-like portions of the levers about the pivot 15, or, in other words, in an annular zone corresponding to the cutting edges of the two blades whereby to oppose these edges being deflected from the cutting plane in which they are supposed to operate. Herein we show a lug 25 carried by one of the blade levers, herein the lever 13 carrying the relatively heavy blade 19 which supports the other lever. The lug 25 here shown projects outwardly toward the distal end of blade 19 opposite to its edge but in spaced relation thereto and bears on the inner face of the blade 17. The lug is received within the outlines of blade 17 in all positions of the parts and thus not only is masked thereby in the open position shown in Fig. 3 so that it does not interfere with the cutting edge at the arc 171 when the tool is opened, but also in the closed position of Figs. 1 and 2 so that the contour of the closed tool is smooth and its application to the work, as, for instance, by passing it up between closely grouped branches, is facilitated. In the case of the pruner here described the blade 17 may thus be made relatively thin, but being directly supported from its heavier companion against the deflecting strains set up in the work crossing of the edges is effectually opposed.

We are aware that the invention may be embodied in other specific forms without departing from the spirit or essential attributes thereof, and we therefore desire the present embodiment to be considered in all respects as illustrative and not restrictive; reference being had to the appended claims rather than to the foregoing description to indicate the scope of the invention.

We claim:

1. A cutting tool having cooperating pivoted blades movable past one another, the blades presenting in all open positions thereof an open throat extending without substantial restriction from their distal ends to the point of intersection of the work-engaging edges, said edges having portions which, when the blades are opened to a predetermined position, lie on a common circle, the edges extending from the extremity of the circular arcs as relatively flat, concave and convex curves shaped to define between them a substantially constant angle of intersection throughout closing movement.

2. A cutting tool having cooperating pivoted blade levers each having a single sharpened edge movable to carry the blade edges past one another in the manner of shears, the edges defining at all times an open throat and being shaped to effect a cut progressively from their inner ends to their distal ends, one of said levers having a lug projecting therefrom to overlie the cooperating lever in an annular zone corresponding to the cutting edges of the blades and being at all times spaced from said cutting edges.

3. A cutting tool having two only cooperating blades pivoted to move over one another in the manner of shears, the edges defining at all times an open throat and being shaped to effect a cut progressively from their inner ends to their distal ends, one of said blades having a lug extending outwardly from adjacent its pivot in spaced opposition to the cutting edge thereof and cooperating with the side of the other blade to oppose relative deflection of the blades under forces set up by the resistance of the material acted on by the tool the edge of the lug being at all times spaced inwardly from the cutting edge of the other blade.

4. A cutting tool having cooperating pivoted blade levers each having a single sharp edge movable to carry the blade edges past one another in the manner of shears, the edges defining at all times an open throat and being shaped to effect a cut progressively from their inner ends to their distal ends, one of said levers having a lug projecting therefrom toward the distal end of the cooperating lever to bear thereon in an annular zone corresponding to the cutting edges and being masked by said cooperating lever in all positions of the levers.

5. A cutter comprising cooperating pivoted levers having blade portions with sharpened cutting edges extending throughout the length of their work-engaging portions and movable past one another in the manner of shears, which edges define an open throat and are shaped to effect a cut progressively from their inner ends to their distal ends, one blade being formed to have substantially greater penetrative capacity than the other, said other blade having a major bevel angle progressively decreasing outwardly.

6. A cutter comprising cooperating pivoted levers having blade portions with sharpened cutting edges extending throughout the length of their work-engaging portions and movable past one another in the manner of shears, which edges define an open throat and are shaped to effect a cut progressively from their inner ends to their distal ends, one blade being formed to have substantially greater penetrative capacity than the other, said other blade having a major bevel angle progressively decreasing outwardly, and having a lug extending therefrom in an annular zone corresponding to the cutting edges of the blades and bearing on the said one blade to oppose relative deflection of the blades.

7. A cutter comprising two cutting blades having sharpened edges extending throughout the length of their work-engaging portions and pivotally connected to move one over the other, the edges defining at all times an open throat and being shaped to effect a cut progressively from their inner ends to their distal ends, one blade having a substantially constant major bevel on its outer face and the other a major bevel on its outer face increasing in acuteness toward its distal end.

8. A cutter comprising two cutting blades having sharpened edges extending throughout the length of their work-engaging portions and pivotally connected to move one over the other, the edges defining at all times an open throat and being shaped to effect a cut progressively from their inner ends to their distal ends, one blade having a substantially constant major bevel on its outer face and the other a major bevel on its outer face increasing in acuteness toward its distal end, the edges being formed by minor bevels on the inner faces of the blades and converging toward the distal ends thereof.

9. A cutter comprising two cutting blades having sharpened edges extending throughout the length of their work-engaging portions and pivotally connected to move one over the other, the edges defining at all times an open throat and being shaped to effect a cut progressively from their inner ends to their distal ends, one blade having a substantially constant major bevel on its outer face and the other a major bevel on its outer face increasing in acuteness toward its distal end, the edges being formed by minor bevels of substantially constant angle on the inner faces of the blades and converging toward the distal ends thereof.

10. A cutter comprising pivotally connected blades having edges shaped to effect a cut progressively from their inner ends to their distal ends and comprising a blade having a work-engaging edge defined by the intersection of a relatively small bevel on the inner face of the blade and a relatively large bevel on the outer face of the blade, the angle between said large outer bevel and said inner face, measured normal to the edge, decreasing from inner or pivot end of the edge to the outer end of the edge, and a cooperating blade likewise having a cutting edge and the inner face of which is adapted to move over the inner face of the first blade in the manner of shears.

11. A cutter comprising pivotally connected blades having edges shaped to effect a cut progressively from their inner ends to their distal ends and comprising a blade having a work-engaging edge defined by the intersection of a relatively large bevel on the outer face of the blade and a relatively small bevel on the inner face of the blade, the angle between said small bevel and the inner face of the blade, measured normal to the edge being substantially uniform, but the distance from the plane of the inner face of the blade to the edge formed by the intersection of the two bevels, measured normal to the plane of the inner face of the blade, decreasing from the inner or pivot end of the work-engaging edge to the outer end of the edge, and a cooperating blade likewise having a cutting edge and the inner face of which is adapted to move over the inner face of the first blade in the manner of shears.

12. A cutter comprising pivotally connected blades having edges shaped to effect a cut progressively from their inner ends to their distal ends and comprising a blade having a work-engaging edge defined by the intersection of a relatively large bevel on the outer face of the blade and a relatively small bevel on the inner face of the blade, the distance from said edge to the plane of the inner face of the blade, measured normal to said plane, decreasing from the inner or pivot end of the edge toward the outer end of the edge, and a cooperating blade likewise having a cutting edge and the inner face of which is adapted to move over the inner face of the first blade in the manner of shears.

13. A cutter comprising pivotally connected blades having edges shaped to effect a cut progressively from their inner ends to their distal ends and comprising a blade having a work-engaging edge defined by the intersection of a relatively small bevel on the inner face of the blade and a relatively large bevel on the outer face of the blade, the angle between said large outer bevel and said inner face, measured normal to the edge, decreasing from inner or pivot end of the edge to the outer end of the edge, the distance from the plane of the inner face of the blade to the edge formed by the intersection of the two bevels, measured normal to the plane of the inner face of the blade, decreasing from the inner or pivot end of the work-engaging edge to the outer end of the edge, and a cooperating blade likewise having a cutting edge and the inner face of which is adapted to move over the inner face of the first blade in the manner of shears.

14. A cutter comprising cooperating pivoted levers having blade portions with cutting edges movable past one another in the manner of shears, which edges define an open throat and are shaped to effect a cut progressively from their inner ends to their distal ends, one blade having a uniform, relatively acute major bevel and the other at its inner end a relatively blunt but cutting major bevel gradually increasing in acuteness toward the distal end thereof.

15. A cutter comprising cooperating pivoted levers having blade portions with sharpened cutting edges extending throughout the length of their work-engaging portions and movable past one another in the manner of shears, which edges define an open throat and are shaped to effect a cut progressively from their inner ends to their distal ends, one blade being formed to have substantially greater penetrative capacity than the other, said other blade having a lug extending therefrom in an annular zone corresponding to the cutting edges of the blades and bearing on the said one blade to oppose relative deflection of the blades.

HENRY W. PORTER.
JOHN W. GEDDES.